US011063955B2

(12) United States Patent
Rothschild

(10) Patent No.: US 11,063,955 B2
(45) Date of Patent: Jul. 13, 2021

(54) SYSTEM AND METHOD FOR GAINING ACCESS OF DEVICES BASED ON USER'S IDENTITY

(71) Applicant: Leigh Rothschild, Miami, FL (US)

(72) Inventor: Leigh Rothschild, Miami, FL (US)

(*) Notice: Subject to any disclaimer, the term of this patent is extended or adjusted under 35 U.S.C. 154(b) by 0 days.

(21) Appl. No.: 16/656,281

(22) Filed: Oct. 17, 2019

(65) Prior Publication Data
US 2021/0120003 A1 Apr. 22, 2021

(51) Int. Cl.
*H04W 12/06* (2021.01)
*H04L 29/06* (2006.01)
*H04L 9/06* (2006.01)
*H04L 9/32* (2006.01)
*H04W 12/08* (2021.01)

(52) U.S. Cl.
CPC .......... *H04L 63/102* (2013.01); *H04L 9/0625* (2013.01); *H04L 9/0631* (2013.01); *H04L 9/3226* (2013.01); *H04L 9/3234* (2013.01); *H04L 63/0853* (2013.01); *H04L 63/0861* (2013.01); *H04W 12/06* (2013.01); *H04W 12/08* (2013.01); *H04L 2209/805* (2013.01)

(58) Field of Classification Search
CPC . H04L 63/0853; H04L 9/0625; H04L 9/3234; H04L 63/0861
See application file for complete search history.

(56) References Cited

U.S. PATENT DOCUMENTS

| | | | | |
|---|---|---|---|---|
| 2008/0091833 A1* | 4/2008 | Pizano | ........... | G06F 21/602 709/229 |
| 2012/0167232 A1* | 6/2012 | Moosavi | ........... | H04W 12/06 726/29 |
| 2014/0366105 A1* | 12/2014 | Bradley | ........... | H04W 12/06 726/5 |
| 2015/0286813 A1* | 10/2015 | Jakobsson | ........... | G06F 21/35 726/9 |
| 2016/0007007 A1* | 1/2016 | Nevet | ........... | G06K 9/2081 726/19 |
| 2016/0034887 A1* | 2/2016 | Lee | ........... | G06F 3/017 705/39 |
| 2016/0188290 A1* | 6/2016 | Wang | ........... | G06F 3/0346 700/94 |

* cited by examiner

*Primary Examiner* — Said M Elnoubi

(57) ABSTRACT

A system and a method for gaining access of devices based on a user's identity are disclosed. The method comprises a target device detecting a user worn accessory present in vicinity of a target device. Upon detection, the target device receives a user identity (UID) from the user worn accessory. The user worn accessory sends the UID based on verification of user's body data. Upon receiving the UID, the target device matches the UID with a list of known UID's to identify access rights assigned to the target device. Based on the identified access rights, the target device provides access to the user. Thus, the user may automatically get an access without handling the target device.

17 Claims, 4 Drawing Sheets

SYSTEM AND METHOD FOR GAINING ACCESS OF DEVICES BASED ON USER'S IDENTITY

CROSS-REFERENCE TO RELATED PATENT APPLICATIONS

This application is a divisional application of U.S. application Ser. No. 16/030,910, filed on Jul. 10, 2018, which is a continuation of U.S. Provisional Application No. 62/530,314, filed on Jul. 10, 2017.

FIELD OF THE DISCLOSURE

The present disclosure is generally related to automatic identification of a user, and more particularly related to automatic identification of the user by user worn accessories.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

User devices such as smart phones often consist of sensitive user data. Thus, access of the user device needs to be restricted from other users to maintain privacy and to avoid fraudulence. There exist a lot of techniques for verifying identity of a user, for maintaining limited access of the user devices. Such identity verification techniques use one of passwords, patterns, and biometrics such as face, fingerprints, finger veins, and retina.

The limitation associated with such verification methods comprises the effort taken by a user to unlock the user device for each time. Usage of biometric sensors in the user device also increases overall cost of the user device. Many times, the user also needs to make multiple attempts to unlock the device due to calibration errors and poor recognition by the sensors.

Another problem faced by the user is theft of their user devices. A user loses all his confidential data in case of loss of his personal device. Thus, there remains a need for automatic identification of the user by the user device to allow access to the user. Further, a method to avoid theft of the user devices is also desired

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
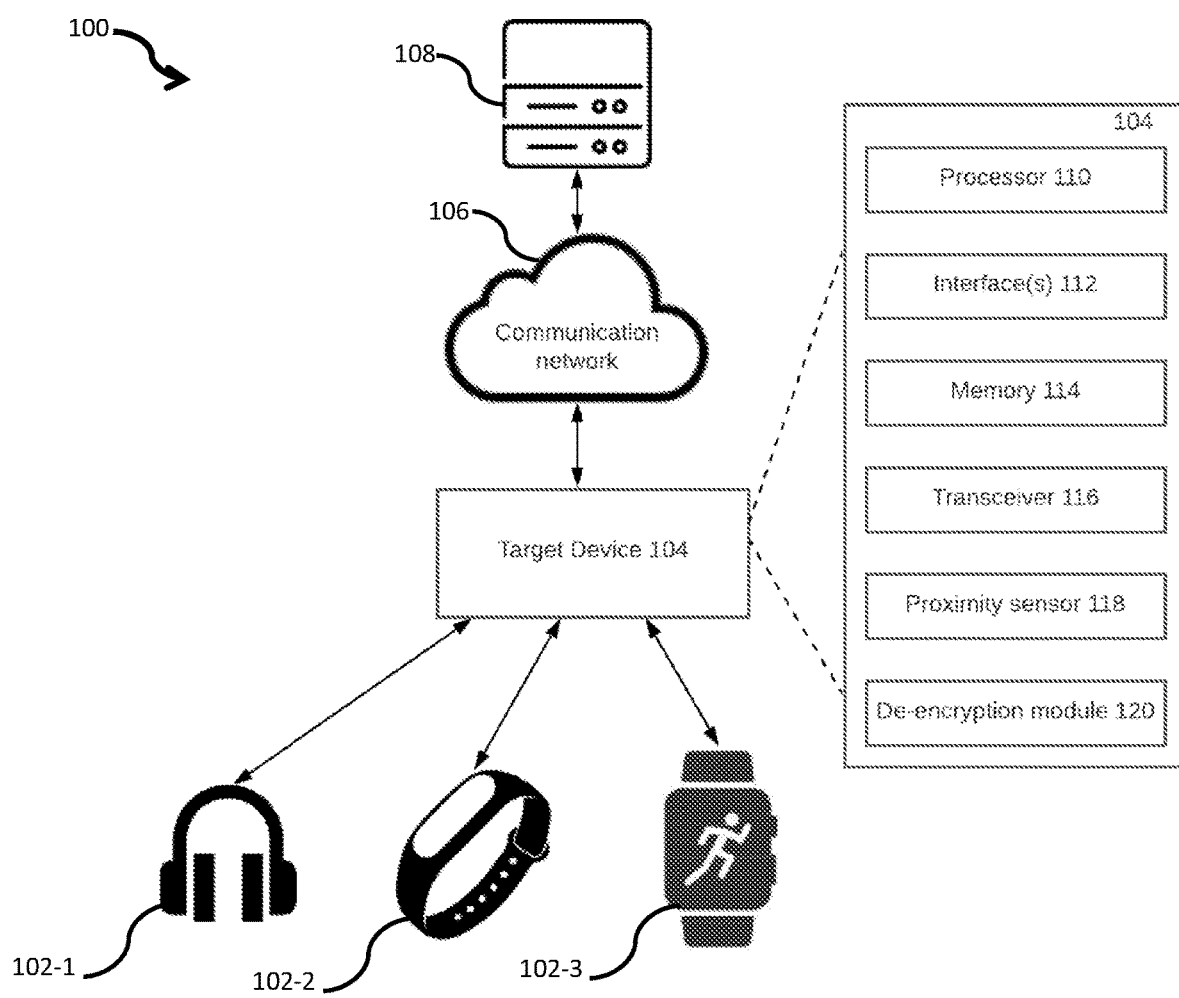
FIG. 1 illustrates a network connection diagram of a system I 00 for gaining access of devices based on a user's identity, according to an embodiment.

FIG. 1 illustrates a network connection diagram of the system 100 for gaining access of devices based on a user's identity, according to an embodiment. FIG. 1 illustrates user worn accessones (102-1 to 102-3) communicating with a target device 104. The target device 104 communicates with a remote server 108 through a communication network 106. The target device 104 comprises a processor 110, interface (s) 112, memory 114, transceiver 116, and proximity sensor 118.

The communication network 106 may be implemented using at least one communication technique selected from Visible Light Communication (VLC), Worldwide Interoperability for Microwave Access (WiMAX), Long term evolution (LTE), Wireless local area network (WLAN), Infrared (IR) communication, Public Switched Telephone Network (PSTN), Integrated Services Digital Network (ISDN), Broadband, cellular, Optical Fibre network, Radio waves, and other known communication techniques and protocols.

The processor 110 may execute an algorithm stored in the memory 114 for gaining access of devices based on a user's identity. The processor 110 may also be configured to decode and execute any instructions received from one or more other electronic devices or server(s). The processor 110 may include one or more general purpose processors (e.g., INTEL microprocessors) and/or one or more special purpose processors (e.g., digital signal processors or Xilinx System On Chip (SOC) Field Programmable Gate Array (FPGA) processor). The processor 110 may be configured to execute one or more computer-readable program instructions, such as program instructions to carry out any of the functions described in this description.

The interface(s) 112 may be used by a user to program the target device 104. The interface(s) 112 may be used either to accept an input from the user or to provide an output to the user, or performing both the actions. The interface(s) 112 may either be a Command Line Interface (CLI) or a Graphical User Interface (GUI).

The memory 114 may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

In one embodiment, a user may wear at least one of the user worn accessory (102-1 to 10-3). The user worn accessory may be any of a headphone 102-1, a smart wristband 102-2, a smart watch 102-3, and any other accessory that could be used for gaining access of devices based on a user's identity. In one case, the user may wear the headphone 102-1. Successively, the proximity sensor 118, present in the target device 104, may detect the headphone 102-1 to be present in vicinity. The proximity sensor may utilize a communication technique selected from a group consisting of Wireless Fidelity (Wi-Fi), Bluetooth, Near Field Communication (NFC), Infrared (IR), and Radio Frequency Identification (RFID).

Post detecting the headphone 102-1, the target device 104 may verify if the user is wearing the headphone 102-1 or the headphone 102-1 is kept idle. The target device 104 may receive such verification from the headphone device 102-1. In one case, the headphone device 102-1 may comprise a pressure sensor for determining a current usage by the user i.e. the user wearing the headphone device 102-1. The pressure sensor may be present in at least one ear cup of right and left speaker of the headphone device 102-1, or in the headband attaching the ear cups. The headphone device 102-1 upon determining about being worn by the user may transmit the UID to the target device 104.

The target device 104 may receive the user identity (UID) from the headphone 102-1. In one case, the UID may be received in an encrypted format. The encryption may be performed by an encryption module 210 present in the headphone 102-1. Further, the encryption module 210 may utilize an encryption technique such as Rivest Shamir Adleman (RSA), Triple Data Encryption Standard (DES), Blowfish, Twofish, Advanced Encryption Standard (AES) and the like. The encryption may be performed using a 32-bit or 64-bit encryption standard. The encryption technique may be selected based on a user input or selection.

The target device 104 may receive the User Identity (UID) by the transceiver 116. The received UID may be present in an encrypted format in one case. A de-encryption module 120 present in the target device 104 may de-encrypt the received UID. The de-encrypted UID may be any of an alphanumeric key, image, and answers to security questions, or any other identifier unique to the user. In one case, the alphanumeric key may be received as the UID.

Figure 2:
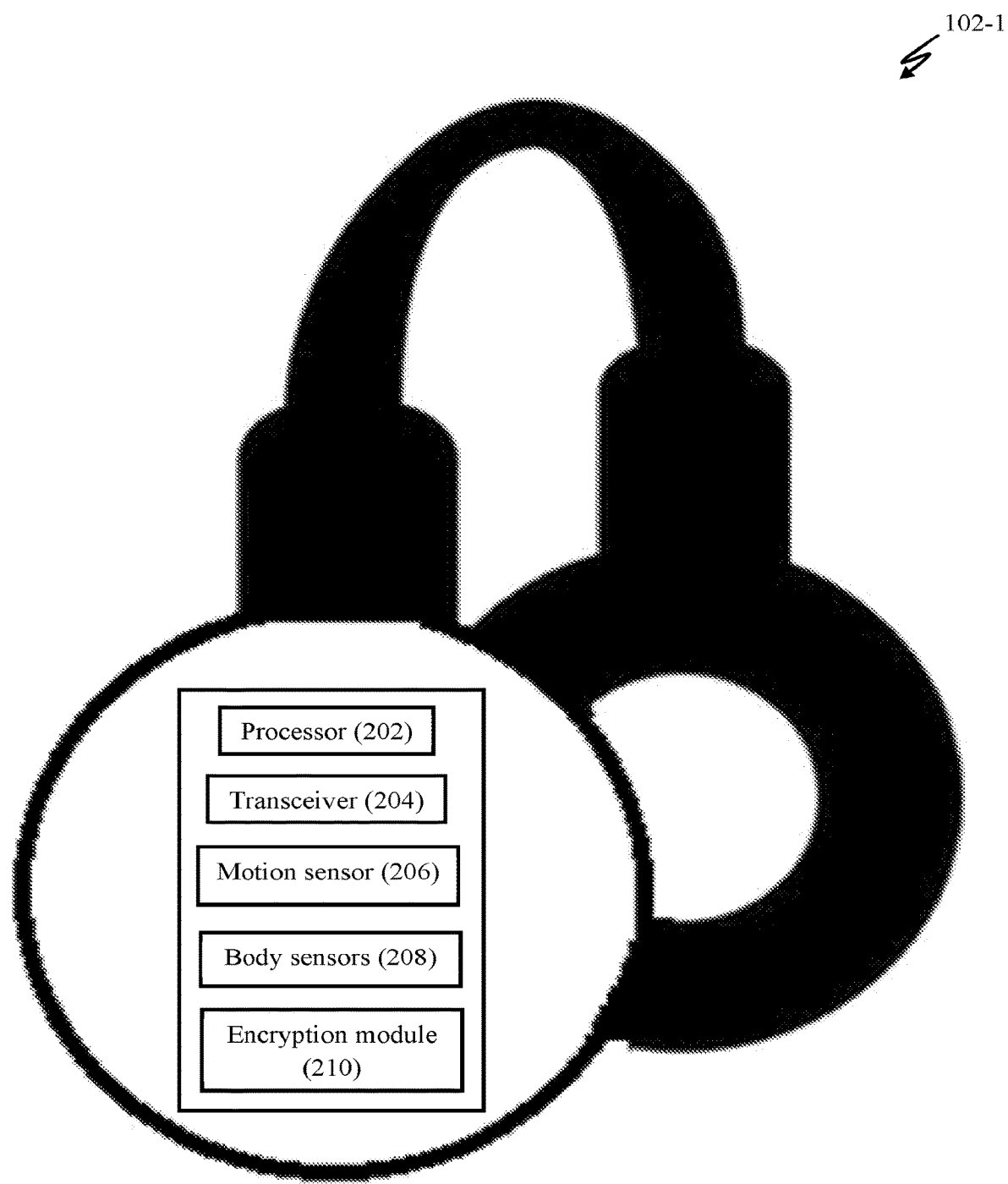
FIG. 2 illustrates different components of a user worn accessory i.e. a headphone I 02-1.

In one embodiment, the headphone 102-1 may determine if the user is actually wearing the headphone 102-1 or the headphone 102-1 is kept idle. The headphone 102-1 may send the UID only upon confirming that the user is wearing the headphone 102-1. For such detection, motion sensors 206 present in the headphone 102-1 may be used to capture motion data. The motion data may be analyzed by a processor 202 of the headphone 102-1, to confirm if the headphone 102-1 is being worn by the user. Post confirming, a transceiver 204 of the headphone 102-1 may send the UID to the target device 104. FIG. 2 illustrates different components of the headphone 102-1.

In another embodiment, the UID may be sent upon verifying if the headphone 102-1 is being worn by an owner of the headphone 102-1. For such verification, the user's identity may be determined based on user's body data. The user's body data may be captured using body sensors 208 present in the headphone 102-1. The body sensors 208 may be configured to monitor body parameters selected from a group consisting of heart rate, heart rate variability, respiratory rate, skin temperature, body posture, coughing, smoking, drinking, speaking, and breathing. The recorded body parameters may be analyzed by the processor 202 to verify if the owner of the headphone 102-1 is actually wearing the headphone 102-1. Upon successful verification, a transceiver 204 of the headphone 102-1 may transmit the UID to the target device 104.

In one embodiment, successive to receiving the UID, the target device 104 may match the UID with a list of known UID's stored in the memory 114. The target device 104 may match the received UID for identifying access rights assigned to the UID. Based on the access rights assigned to the UID, the target device 104 may provide an access to the user.

In one embodiment, the target device 104 may be either of a smart phone, laptop, tablet, and a phablet. The target device 104 is shown to be a smart phone as an example. The smart phone may allow its access to the user based on a successful verification of identity of the user wearing the user worn accessory. The identity of the user may be verified with the user worn accessory, in an above described manner. Thus, an owner of the smart phone may automatically get an access of the smart phone with help of the user worn accessory.

In another embodiment, the target device 104 may be a physical access system. The physical access system may allow movement of the user based on a successful verification of identity of the user, wearing the user worn accessory. The identity of the user may be verified with the user worn accessory, in an above described manner. Thus, a user may automatically find access through the physical access system with help of the user worn accessory.

In one embodiment, the target device 104 and the user worn accessory may comprise a button (either soft button or hard button) for terminating a connection between them. The button may be integrated with a biometric sensor, such as a fingerprint scanner. The fingerprint scanner may allow switching ON and OFF the button only upon verifying an identity of the user. Further, the target device 104 and the user worn accessory may comprise an alarm. The alarm may be implemented using speakers and/or Light Emitting Devices (LEDs). The alarm may be raised in response to a trigger generated by the target device 104. The target device 104 may generate the trigger in case of unauthorized termination of connection between the target device 104 and the user worn accessory. For example, if a thief snatches the target device 104 or the user worn accessory and runs away, the alarm may be raised and may not be deactivated till an authorized user switches OFF the alarm.

It is well understood that the above explained embodiments of present disclosure may be implemented with modifications lying within scope of the present disclosure. It is also understood that the above disclosure may allow a user for gaining access of different devices. A few of the applications may comprise automatic access of devices such as a laptop, smart phone, and tablet. Further, the user may also get recognized by physical access systems, attendance systems, banking systems, and other system where identity of an individual may need to be verified. Using the above described methodology, user preferences may also be set automatically in an environment, based on the user's identity. A few examples of setting the user preferences may include setting up of temperate, favorite music, lighting conditions, humidity conditions, and selecting a floor number on control panel of a lift.

Figure 3:
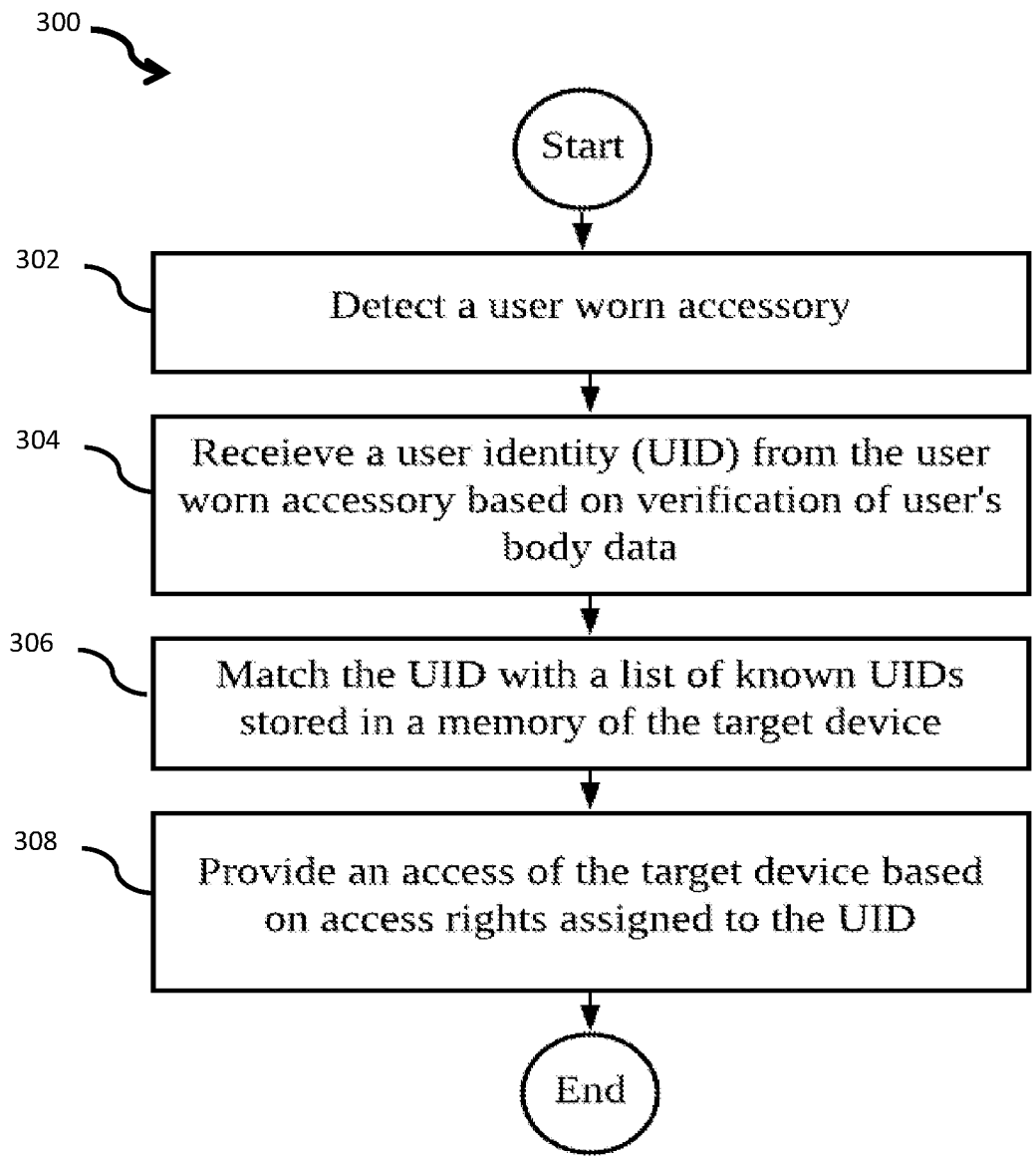
FIG. 3 illustrates a flowchart 300 of a method for gaining access of devices based on a user's identity, according to an embodiment.

FIG. 3 illustrates a flowchart 300 of a method of gaining access of devices based on a user's identity, according to an embodiment. FIG. 3 comprises a flowchart 300 that is explained in conjunction with the elements disclosed in FIG. 1.

The flowchart 300 of FIG. 3 shows the architecture, functionality, and operation for gaining access of devices based on a user's identity. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIG. 3 may in fact be executed substantially concurrently or the blocks may sometimes be executed in the reverse order, depending upon the functionality involved. Any process descriptions or blocks in flowcharts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine. The flowchart 300 starts at the step 302 and proceeds to step 308.

At step 302, a target device 104 may detect a user worn accessory 102-1 (referred to using 102 for simplicity) present in vicinity. In one embodiment, the user worn accessory 102 may be detected by a proximity sensor 118 of the target device 104.

At step 304, the target device may receive a user identity (UID) transmitted by the user worn accessory 102. The UID may be transmitted by the user worn accessory 102 based on verification of user's body data. In one embodiment, the user's body data may be captured by body sensors 208, transmitted by a transceiver 204 of the user worn accessory 102, and received by a transceiver 116 of the target device.

At step 306, the UID may be matched with a list of known UID's stored in a memory 114 of the target device 104. The UID may be matched to identify access rights set for the UID. In one embodiment, the UID may be matched by a processor 202 of the user worn accessory 102.

At step 308, an access of the target device 104 may be provided based on the access rights set for the UID. In one embodiment, the access may be provided a processor 110 of the target device 104.

Figure 4:
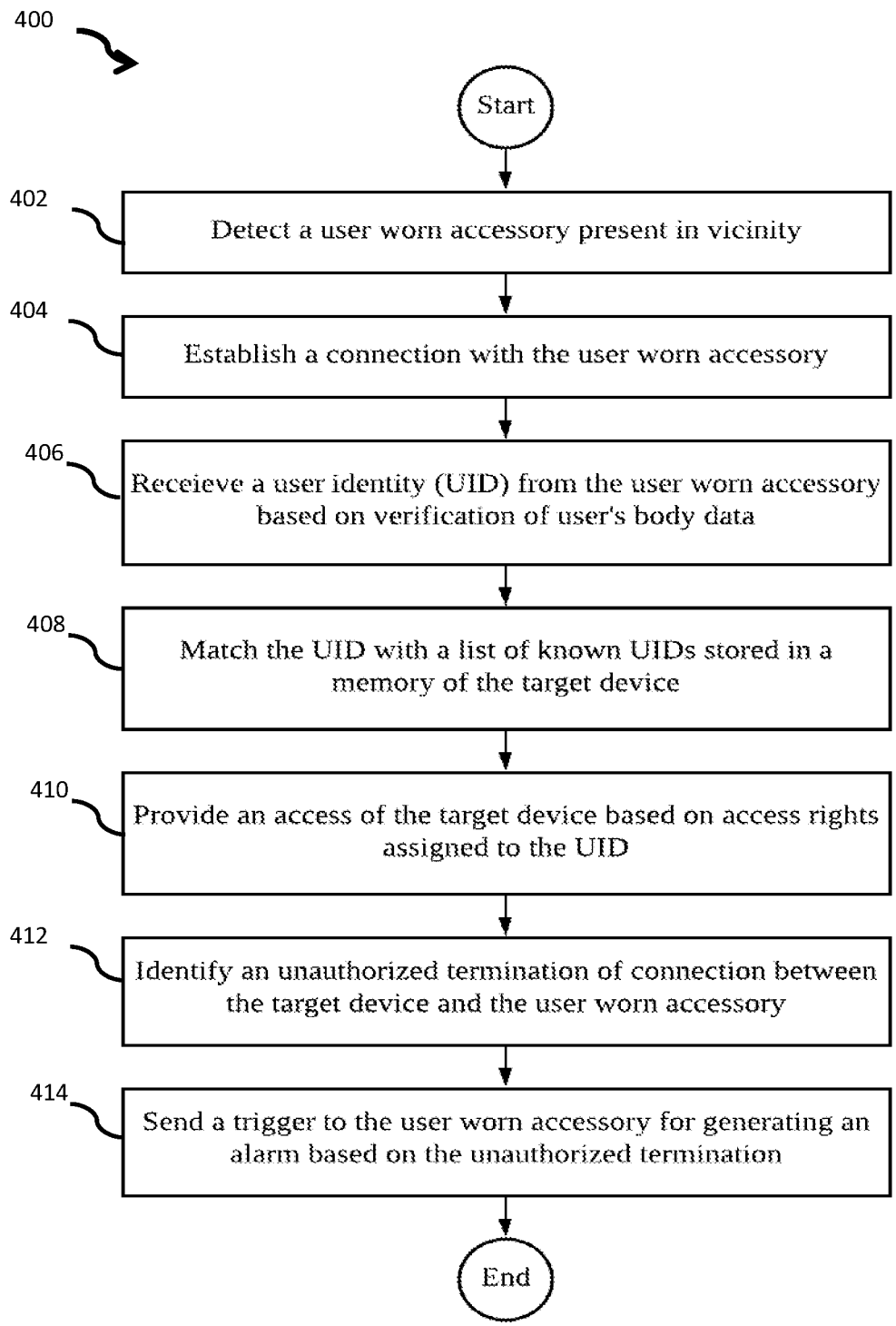
FIG. 4 illustrates a flowchart 400 of a method for gaining access of devices based on a user's identity, according to an embodiment.

FIG. 4 illustrates a flowchart 400 of another method of gaining access of devices based on a user's identity, according to an embodiment. FIG. 4 comprises a flowchart 400 that is explained in conjunction with the elements disclosed in FIG. 1.

The flowchart 400 of FIG. 4 shows the architecture, functionality, and operation for gaining access of devices based on a user's identity. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIG. 4 may in fact be executed substantially concurrently or the blocks may sometimes be executed in the reverse order, depending upon the functionality involved. Any process descriptions or blocks in flowcharts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine. The flowchart 400 starts at the step 402 and proceeds to step 414.

At step 402, a target device 104 may detect a user worn accessory 102 present in vicinity. In one embodiment, the user worn accessory 102 may be detected by a proximity sensor 118 of the target device 104.

At step 404, a connection may be established between the target device 104 and the user worn accessory 102. In one embodiment, the connection may be established by a processor 202 of the user worn accessory 102.

At step 406, the target device may receive a user identity (UID) from the user worn accessory 102. The UID may be transmitted by the user worn accessory 102 based on verification of user's body data. In one embodiment, the user's body data may be captured by body sensors 208, transmitted by a transceiver 204 of the user worn accessory 102, and received by a transceiver 116 of the target device 104.

At step 408, the UID may be matched with a list of known UID's stored in a memory 114 of the target device 104. The UID may be matched to identify access rights set for the UID. In one embodiment, the UID may be matched by the processor 202 of the user worn accessory 102.

At step 410, an access of the target device 104 may be provided based on the access rights set for the UID. In one embodiment, the access may be provided a processor 110 of the target device 104.

At step 412, an unauthorized termination of connection between the target device 104 and the user worn accessory 102 may be identified. In one embodiment, the unauthorized termination may be identified by the processor 110 of the target device 104.

At step 414, a trigger may be sent to the user worn accessory 102 for generating an alarm. The trigger may be sent based on the identification of unauthorized termination.

In one embodiment, the trigger for alarm may be sent by the processor 110 of the target device 104.

Embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, compact disc read-only memories (CD-ROMs), and magneto-optical disks, semiconductor memories, such as ROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e. g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

What is claimed is:

1. A computer implemented method of gaining access of devices based on a user's identity,
   the computer implemented method being executed on a target device and comprising:
   detecting, by a proximity sensor, a user worn accessory present in vicinity of the target device;
   receiving, by a transceiver, a user identity (UID) from the user worn accessory;
   matching, by a processor, the UID with a list of known UID's stored in a memory of the target device, to identify access rights assigned to the UID;
   providing, by the processor, an access of the target device to the user, based on the access rights assigned to the UID; and
   identifying, by the processor, an unauthorized termination of connection between the target device and the user worn accessory; and
   sending, by the transceiver, a trigger to the user worn accessory for generating an alarm based on the unauthorized termination of connection.

2. The method of claim 1, wherein the proximity sensor utilizes a communication request
   selected from a group consisting of Wireless Fidelity (Wi-Fi), Bluetooth, Near Field Communication (NFC), Infrared (IR), and Radio Frequency Identification (RFID).

3. The method of claim 1, wherein the user worn accessory is selected from a group consisting of headphone, smart wristband, and a smart watch.

4. The method of claim 1, wherein the UID is at least one of an alphanumeric key, image, and answers to security questions.

5. The method of claim 1, wherein the UID is sent by the user worn accessory based on verification of user's body data recorded using body sensors.

6. The method of claim 5, wherein the body sensors are configured to monitor body parameters selected from a group consisting of heart rate, heart rate variability, respiratory rate, skin temperature, body posture, coughing, smoking, drinking, speaking, and breathing.

7. The method of claim 1, wherein the UID is sent by the user worn accessory based on user's motion data.

8. The method of claim 1, further comprising encrypting the UID using an encryption technique selected from a group consisting of Rivest Shamir Adleman (RSA), Triple Data Encryption Standard (DES), Blowfish, Twofish, and Advanced Encryption Standard (AES).

9. The method of claim 8, wherein the encryption technique is selected based on a user input.

10. A system for gaining access of devices based on a user's identity, the system comprising:
    a processor; and
    a memory coupled to the processor, wherein the processor is capable of executing programmed instructions stored in the memory to:
    detect, by a proximity sensor, a user worn accessory present in vicinity of the target device;
    receive, by a transceiver, a user identity (UID) from the user worn accessory;
    match the UID with a list of known UID's stored in the memory, to identify access rights assigned to the UID;
    provide an access of the target device to the user, based on access rights assigned to the UID; and
    generate an alarm, by at least one of the target device and the user worn accessory, upon unauthorized termination of connection between the target device and the user worn accessory.

11. The system of claim 10, wherein the proximity sensor utilizes a communication request
    selected from a group consisting of Wireless Fidelity (Wi-Fi), Bluetooth, Near Field Communication (NFC), Infrared (IR), and Radio Frequency Identification (RFID).

12. The system of claim 10, wherein the user worn accessory is selected from a group consisting of headphone, smart wristband, and a smart watch.

13. The system of claim 10, wherein the UID is at least one of an alphanumeric key, image, and answers to security questions.

14. The system of claim 10, wherein the UID is sent by the user worn accessory based on verification of user's body data, wherein the user's body data is captured using body sensors present on the user worn accessory.

15. The system of claim 14, wherein the body sensors are configured to monitor body parameters selected from a group consisting of heart rate, heart rate variability, respiratory rate, skin temperature, body posture, coughing, smoking, drinking, speaking, and breathing.

16. The system of claim 10, wherein the UID is sent by the user worn accessory based on user's motion data captured using motion sensors present on the user worn accessory.

17. The system of claim 10, further comprising a pressure sensor present in the user worn accessory for determining a current usage of the user worn accessory and thereafter transmitting the UID to the target device based on the current usage.

* * * * *